US009727062B2

(12) United States Patent
Kocurek et al.

(10) Patent No.: US 9,727,062 B2
(45) Date of Patent: Aug. 8, 2017

(54) SHAPE MEMORY ALLOY THERMOSTAT FOR SUBSEA EQUIPMENT

(75) Inventors: Chris Kocurek, Houston, TX (US); Chelsea Green, Cypress, TX (US)

(73) Assignee: ONESUBSEA IP UK LIMITED, London (GB)

( * ) Notice: Subject to any disclaimer, the term of this patent is extended or adjusted under 35 U.S.C. 154(b) by 685 days.

(21) Appl. No.: 13/183,304

(22) Filed: Jul. 14, 2011

(65) Prior Publication Data

US 2013/0015376 A1    Jan. 17, 2013

(51) Int. Cl.
| | |
|---|---|
| G05D 23/02 | (2006.01) |
| F16K 31/00 | (2006.01) |
| F16K 3/24 | (2006.01) |
| F16K 3/26 | (2006.01) |
| E21B 41/00 | (2006.01) |
| E21B 47/01 | (2012.01) |

(52) U.S. Cl.
CPC ....... *G05D 23/025* (2013.01); *E21B 41/0007* (2013.01); *E21B 47/011* (2013.01); *F16K 3/246* (2013.01); *F16K 3/265* (2013.01); *F16K 31/002* (2013.01)

(58) Field of Classification Search
CPC .. E21B 33/035; E21B 33/064; E21B 33/0355; E21B 33/037; G05D 23/08; F16K 31/002
USPC ......... 236/93 R, 101 R, 102, 101 D; 251/11; 137/468; 166/363, 368
See application file for complete search history.

(56) References Cited

U.S. PATENT DOCUMENTS

| | | | | |
|---|---|---|---|---|
| 2,895,446 A | | 7/1959 | Upton et al. | |
| 3,087,676 A | * | 4/1963 | Neher, Jr. et al. | 236/34 |
| 3,556,218 A | * | 1/1971 | Talley et al. | 166/265 |
| 4,283,823 A | * | 8/1981 | Buswell | 29/890.12 |
| 4,435,487 A | * | 3/1984 | Supelak | D21C 3/003 429/120 |
| 4,679,598 A | * | 7/1987 | Jee | E21B 43/01 138/103 |
| 4,710,438 A | * | 12/1987 | Leben | H01M 6/34 429/119 |
| 5,263,644 A | * | 11/1993 | Chen | G05D 23/024 236/101 R |
| 5,265,677 A | | 11/1993 | Schultz et al. | |
| 6,427,712 B1 | * | 8/2002 | Ashurst | 137/62 |

(Continued)

FOREIGN PATENT DOCUMENTS

| | | |
|---|---|---|
| DE | 102007039495 A1 | 2/2009 |
| EP | 0010350 A1 | 4/1980 |

(Continued)

OTHER PUBLICATIONS

Falk et al., OMAE2002-28059: Thermal Benefits with Subsea Heat Bank, 2002, ASME, 21st International Conference on Offshore Mechanics.*

(Continued)

*Primary Examiner* — Justin Jonaitis
*Assistant Examiner* — Eric Ruppert
(74) *Attorney, Agent, or Firm* — Fletcher Yoder, P.C.

(57) ABSTRACT

A system, in certain embodiments, includes an SMA thermostat. The SMA thermostat includes a body, a sleeve, a biasing spring and an SMA spring. Upon actuation of the SMA spring at a phase transition temperature, the sleeve is configured to shift and expose flow ports formed in the body.

21 Claims, 6 Drawing Sheets

(56) References Cited

U.S. PATENT DOCUMENTS

| | | |
|---|---|---|
| 7,823,643 B2 | 11/2010 | Wong et al. |
| 2003/0010499 A1 | 1/2003 | Qvam et al. |
| 2007/0105460 A1* | 5/2007 | Vivien .................. F42B 19/26 440/6 |
| 2009/0139727 A1* | 6/2009 | Tanju et al. .................. 166/373 |

FOREIGN PATENT DOCUMENTS

| | | | |
|---|---|---|---|
| EP | 1302711 A1 | | 4/2003 |
| JP | 02208446 | * | 8/1990 |

OTHER PUBLICATIONS

Oxford University, Oxford Press, "define, v.", Oxford English Dictionary, 5 pages, [online] [retrieved on Aug. 20, 2015] Retreived from the internet <www.oed.com/view/Entry/48874>.*

Miura, JP02208446TRANS (English Translation), Aug. 1990.*

PCT International Search Report and Written Opinion for PCT/US2012/046773; mailed on Oct. 8, 2012.

Singapore Written Opinion; Application No. 201400289-3; Dated May 2, 2014; pp. 1-6.

Stoeckel, D. et al.; "Use of Ni—Ti Shape Memory Alloys for Thermal Sensor-Actuators"; SPIE San Diego 1991; 7 pages.

GB Examination Report; Application No. GB1400641.5; Dated Dec. 15, 2018; 8 pages.

* cited by examiner

SHAPE MEMORY ALLOY THERMOSTAT FOR SUBSEA EQUIPMENT

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

A variety of subsea equipment, such as mineral extraction equipment, may be subjected both to high temperatures and low temperatures. For example, mineral extraction equipment, such as valves and other flow control mechanisms, may experience elevated temperatures as fluids flow through the equipment. In addition, the sea water is often very cold at locations of the mineral extraction equipment, thereby subjecting the equipment to cold temperatures in addition to the elevated temperatures. Unfortunately, hot and cold extremes may subject the equipment to thermal stress, degradation, or wear. For example, certain electronics may eventually overheat or degrade at extreme temperatures or as a result of thermal cycles. Accordingly, a need exists to maintain temperatures within an acceptable range to reduce the possibility of overheating, wear or degradation.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Subsea equipment may include insulated structures having pipes or conduits running through the insulated structures. The pipes route various system or operating fluids that may be at elevated temperatures. The pipes may further include flow valves, chokes, and so forth, within the insulated structures. In addition to the fluid pipes and other conduits, the insulated structures are filled with sea water. As heated fluids are routed through the pipes, the sea water within the insulated structures absorbs heat transferred from the fluids flowing through the pipes. Additionally, the insulated structures retain the heat absorbed by the sea water, thereby preventing the heat and energy generated by the subsea system from being released into the surrounding sea environment. The insulated structures may further include electronic assemblies having processors, memory circuits, communications units, power supplies, and so forth. Unfortunately, due to the heat retained by the insulated structures, the sea water within the insulated structures may reach temperatures that cause the electronics assemblies to malfunction and overheat.

To prevent the sea water within an insulated structure from reaching temperatures that causes the electronics assemblies and their subcomponents to overheat, the insulated structure may include an SMA thermostat. The SMA thermostat has one or more SMA springs which are designed and manufactured to undergo a phase transition at a specified temperature (e.g., a temperature below the point at which the electronics assemblies may malfunction or overheat from elevated temperatures). Additionally, the SMA spring of the SMA thermostat are exposed to the sea water within the insulated structure. When the sea water in the insulated structure reaches the specified temperature, the SMA spring undergoes the phase transition and actuates a sleeve of the SMA thermostat. In actuating the sleeve, the SMA spring compresses a biasing spring and opens one or more exit ports to create a flow passage between the interior of the insulated structure and the sea water environment surrounding the insulated structure. In other embodiments, the SMA spring may have a tension configuration. In other words, when the SMA spring undergoes the phase transition and actuates the sleeve of the SMA thermostat, the SMA spring pulls the biasing spring, thereby creating tension in the biasing spring. When the exit ports are open, natural convection and buoyancy differences between the heated sea water within the insulated structure and the cold sea water surrounding the insulated structure cause the heated sea water to escape the insulated structure. In other words, the heated sea water flows to the lower temperature environment (i.e., the sea water surrounding the insulated structure). Furthermore, the insulated structure includes an inlet allowing cold sea water surrounding the insulated structure to enter the insulated structure, thereby lowering the temperature of the sea water within the insulated structure which surrounds the SMA thermostat. As discussed below, once the temperature of the sea water within the insulated structure decreases to a certain level, the SMA spring of the SMA thermostat will transform back into its original phase. With this transformation, the biasing spring of the SMA thermostat will engage the sleeve of the SMA thermostat, thereby closing the exit ports. With the exit ports closed, the sea water within the insulated structure begins to reheat from heat transferred by the fluids flowing through the pipes within the insulated structure.

Figure 1:
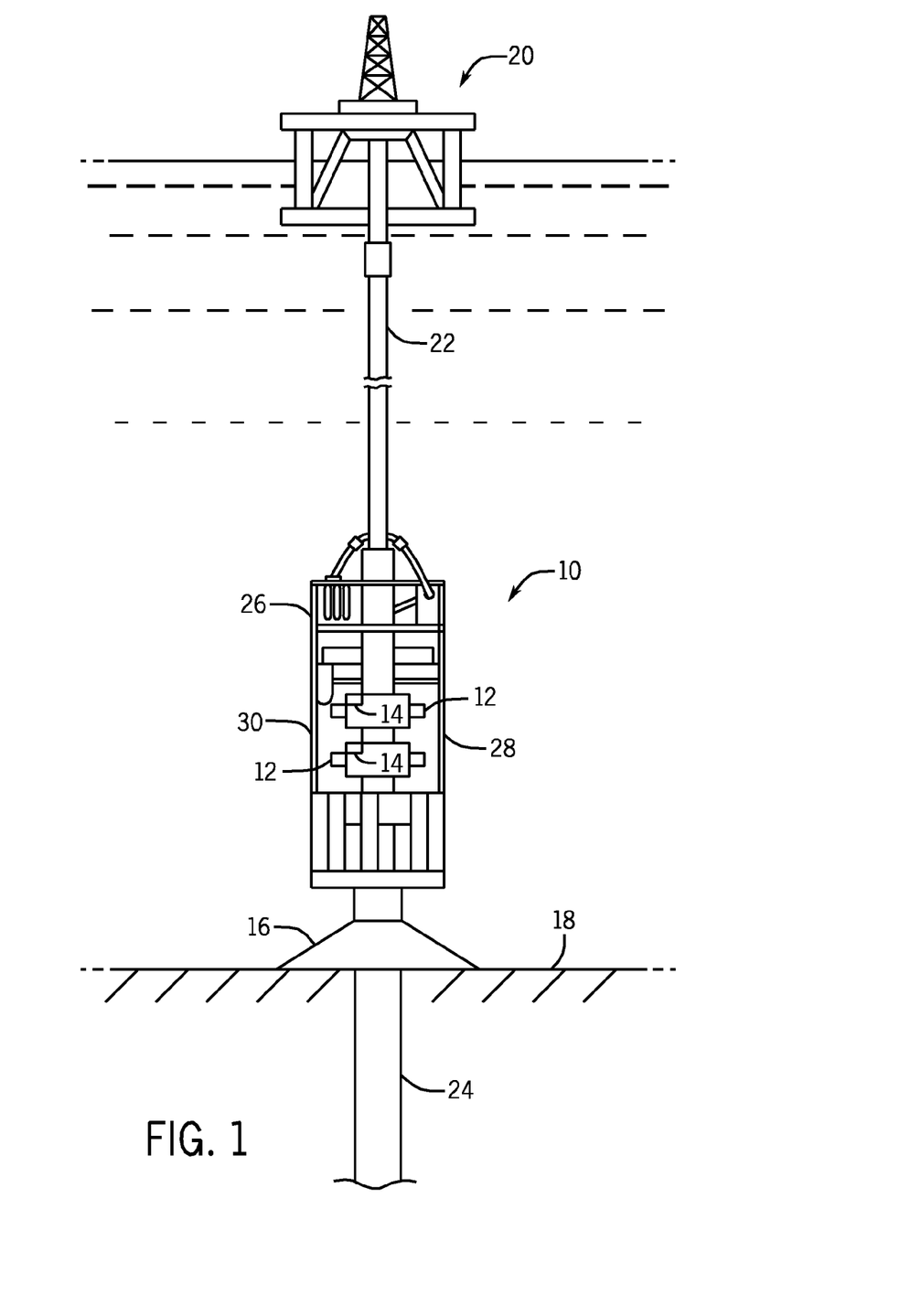
FIG. 1 is a sub-sea BOP stack assembly, which may include one or more shape memory alloy (SMA) thermostats.

The SMA thermostat may be used in various types of equipment. For instance, FIG. 1 depicts a subsea BOP stack assembly 10, which may include one or more insulated structures 12 (i.e., underwater components) having SMA thermostats 14. For example, the SMA thermostats 14 may be subsea equipment thermostats, mineral extraction equipment thermostats, or flow control device thermostats. As illustrated, the BOP stack assembly 10 may be assembled onto a wellhead assembly 16 on the sea floor 18. The BOP stack assembly 10 may be connected in line between the wellhead assembly 16 and a floating rig 20 through a sub-sea riser 22. The BOP stack assembly 10 may provide emergency fluid pressure containment in the event that a sudden pressure surge escapes the well bore 24. Therefore, the BOP stack assembly 10 may be configured to prevent damage to the floating rig 20 and the sub-sea riser 22 from fluid pressure exceeding design capacities. The BOP stack assembly 10 may also include a BOP lower riser package 26, which may connect the sub-sea riser 22 to a BOP package 28.

In certain embodiments, the BOP package 28 may include a frame 30 and insulated structures 12 having SMA thermostats 14. As mentioned above, the insulated structures 12 may include pipes which route various system or operating fluids at elevated temperatures. Heat from the pipes is transferred to the sea water surrounding the pipes within the insulated structures 12. As discussed above, the insulated structures 12 are insulated to prevent unnecessary heat and energy loss from the BOP package 28 to the surrounding sea water. Consequently, the sea water within the insulated structures 12 gradually increases in temperature as heat from the pipes is absorbed by the sea water in the insulated structures 12. As the temperature of the sea water within the insulated structures 12 continues to rise, the temperature may reach a level that can cause electronics assemblies within the insulated structures 12 to malfunction or overheat. Additionally, the excessive heat can cause other degradation as well. For example, the heat can cause the various components within the insulated structures 12 to experience thermal degradation, where higher temperatures can result in material weakening. Therefore, the insulated structures 12 may each include an SMA thermostat 14 to regulate the temperature within the insulated structures 12 in the manner described below.

In general, SMAs are materials which have the ability to return to a predetermined shape when heated. More specifically, when SMAs are below their transformation temperature, they have relatively low elastic moduli and yield strengths and may be deformed into and retain any new shape relatively easy. However, when SMAs are heated above their transformation temperature, they undergo a change in crystal structure, which causes them to return to their original shape with much greater force than from their low-temperature state. During phase transformations, SMAs may either generate a relatively large force against any encountered resistance or undergo a significant dimension change when unrestricted. This shape memory characteristic may provide a unique mechanism for remote, temperature-sensitive actuation.

One particular shape memory material is an alloy of nickel and titanium called Nitinol. This particular alloy is characterized by, among other things, long fatigue life and high corrosion resistance. Therefore, it may be particular useful as an actuation mechanism for a thermostat within the harsh operating conditions encountered with sub-sea mineral extraction applications. As an actuation mechanism, it is capable of up to approximately 5% strain recovery or approximately 500 MPa restoration stress with many cycles, depending upon the material composition. For example, a Nitinol wire 0.5 mm in diameter may generate as much as approximately 15 pounds of force. Nitinol also has resistance properties which enable it to be actuated by heating. Although Nitinol is one example of an SMA which may be used in the SMA thermostats 14 of the disclosed embodiments, any SMAs with suitable transition temperatures and other properties may also be used. Furthermore, the composition of Nitinol may be adjusted to achieve a desired transition temperature. Specifically, the amount of nickel or titanium in Nitinol may be adjusted to raise or lower the transition temperature.

The unique properties of SMAs make them a potentially viable choice for thermostats. For example, when compared to electrical thermostats, SMA thermostats may offer an advantage of being able to operate without electrical sensors or equipment. In addition, SMAs may be fabricated into different shapes, such as wires and thin films. In particular, SMA wires with diameters less than approximately 0.5 mm-1.0 mm, 0.6 mm-0.9 mm, or 0.7 mm-0.8 mm may be used to form springs for use in the SMA thermostats 14. Accordingly, thermostats such as the SMA thermostats 14 described herein may be used in myriad applications. For example, the SMA wires described below may be used in SMA thermostats for use in underwater applications, aircraft applications, automotive applications, and so forth. However, as described herein, the use of SMA wires may provide particular benefits in the realm of sub-sea equipment, such as the SMA thermostats 14 described in FIG. 1.

Figure 2:
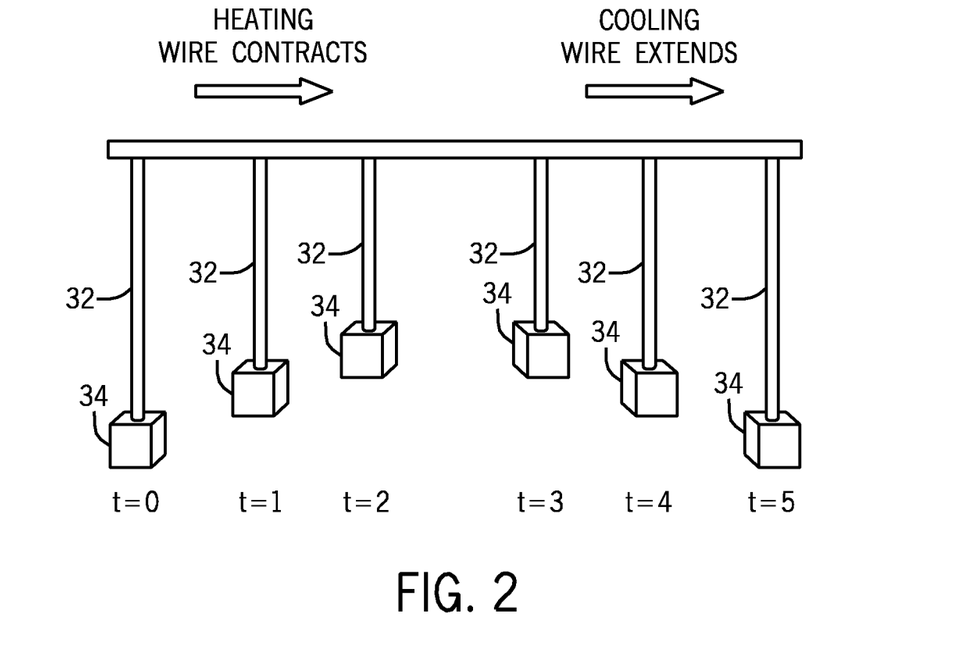
FIG. 2 is an exemplary SMA wire being used to lift a weight.

FIG. 2 depicts an exemplary SMA wire 32 being used to lift a weight 34. In particular, moving from left to right, FIG. 2 illustrates a time series whereby an electrical current is introduced through the SMA wire 32 to gradually heat the SMA wire 32 and then gradually cool the SMA wire 32. In particular, at initial time $t_0$, no electrical current flows through the SMA wire 32. At time $t_0$, the SMA wire 32 is at a temperature below the transition temperature of the SMA wire 32. As such, the SMA wire 32 may have been extended to a deformed shape by the force applied to the SMA wire 32 by the weight 34. Once electrical current is applied to the SMA wire 32, the temperature of the SMA wire 32 gradually increases such that the transition temperature of the SMA wire 32 is exceeded. When this occurs, the SMA wire 32 begins returning to its predetermined shape such that the force applied by the weight 34 is overcome, resulting in the SMA wire 32 lifting the weight 34, as shown at time $t_1$. At some point, such as time $t_2$, the force applied by the weight 34 is be entirely overcome such that the SMA wire 32 returns to its predetermined shape. Therefore, from time $t_0$ to time $t_2$, the SMA wire 32 is heated and, as a result, contracts and overcomes the force of the weight 34. As described above, as the temperature of the SMA wire 32 increases through the transition temperature, the SMA wire 32 either generates a relatively large force against any encountered resistance (e.g., against the force of the weight 34), undergoes a significant dimension change when unrestricted (e.g. lifting the weight 34), or generates some force and undergo some dimension change at the same time (e.g., lifting the weight 34 to some distance below its predetermined state).

Conversely, at time $t_3$, the electrical current ceases flowing through the SMA wire 32. Once the electrical current ceases flowing through the SMA wire 32, the temperature of the SMA wire 32 gradually decreases to below the transition temperature of the SMA wire 32. When this occurs, the force of the weight 34 begins deforming the SMA wire 32, as shown at time $t_4$. At some point, such as time $t_5$, the force applied by the weight 34 entirely overcomes the SMA wire 32, extending it to the deformed shape from time $t_0$. Therefore, from time $t_3$ to time $t_5$, the SMA wire 32 is cooled and, as a result, extends due to the force of the weight 34. As the temperature of the SMA wire 32 decreases through the transition temperature, the SMA wire 32 undergoes a significant dimension change when unrestricted (e.g. in allowing the weight 34 to fall).

Figure 3:
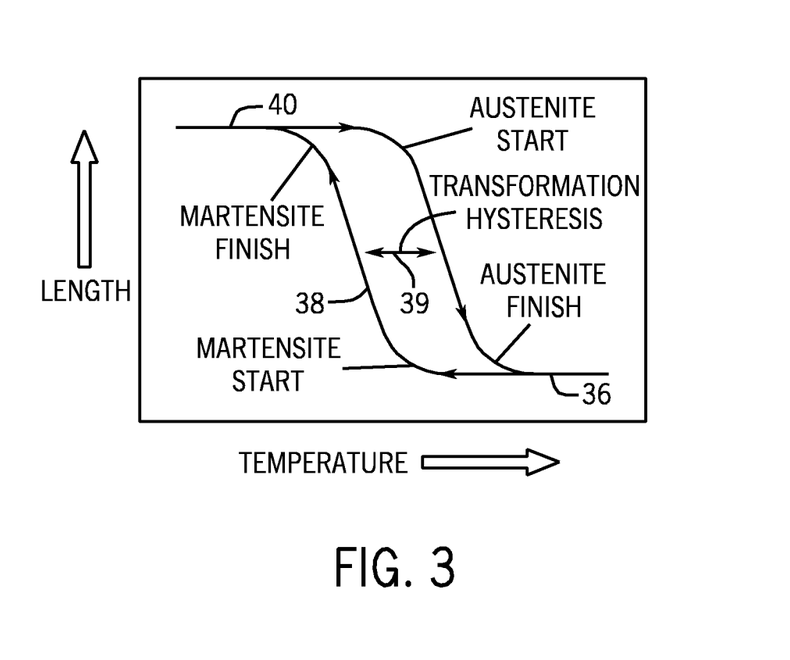
FIG. 3 is an SMA transitioning from the Austenite phase to the Martensite phase and back.

The unique properties of SMAs result from the reversible phase transformation between their crystal structures, for instance, the stronger high temperature Austenite phase and the weaker low temperature Martensite phase. FIG. 3 depicts an SMA transitioning from the Austenite phase (i.e., a first phase) to the Martensite phase (i.e., a second phase) and back. When cooling from its high temperature Austenite phase 36 (i.e., the first phase), the SMA undergoes a transformation 39 (i.e., a phase change) to a twinned Martensite phase 38. The twinned Martensite phase 38 may be easily deformed by an external force. This process is often called de-twinning. The Martensite phase 40 (i.e., the second phase) is then reversed when the de-twinned structure reverts upon heating to the Austenite phase 36. The unique ability of a reversible crystalline phase transformation enables an SMA object either to recover its initial heat-treated shape (up to approximately 5% strain) when heated above a critical transition temperature or alternatively to generate high recovery stresses (in excess of 500 MPa). As shown in FIG. 3, the transformation 39 exhibits a hysteretic effect, in that the transformations on heating and on cooling do not overlap. This hysteretic effect may be taken into account when designing and selecting the properties of an SMA material for use in an SMA thermostat 14.

Figure 4:
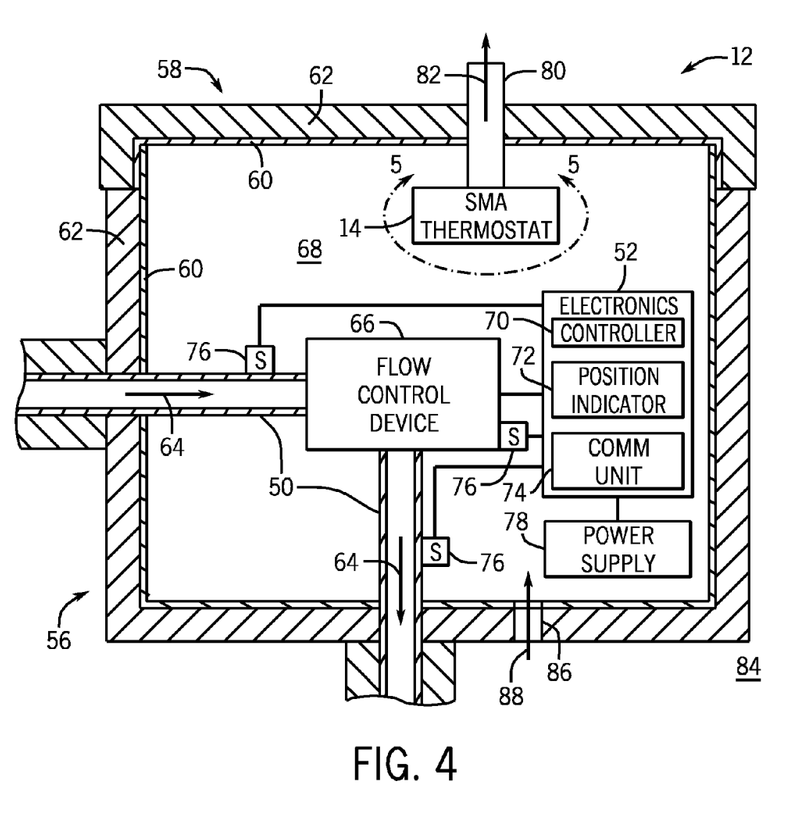
FIG. 4 is an embodiment of a subsea insulated structure having an SMA thermostat.

FIG. 4 is a schematic of an embodiment of one of the insulated structures 12 shown in FIG. 1 including pipes 50 passing through the insulated structure 12, an electronics assembly 52 (i.e., an internal component), and the SMA thermostat 14. In the illustrated embodiment, the insulated structure 12 has a body 56 and a lid 58. The body 56 and the lid 58 of the insulated structure 12 each have an insulative layer 62 and an optional structural layer 60. As discussed above, the insulative layer 62 serves to retain heat and energy within the insulative structure 12. For example, at times when the BOP package 28 is shut down, the insulative structure 12 may retain energy and/or heat within the insulative structure 12 to reduce unnecessary energy and/or heat loss from the BOP package 28.

The pipes 50 flow a fluid 64, such as a system or operating fluid, which may be at an elevated temperature (i.e., heated). In the illustrated embodiment, the pipes 50 also include a flow control device 66. For example, the flow control device 66 may be a valve or a choke and may be configured to regulate a flow rate of the fluid 64. Additionally, the flow control device 66 may be electrically operated, pneumatically operated, hydraulically operated, and so forth. In other embodiments, the flow control device 66 may be replaced by an angled fitting, reducer, or other connection between the pipes 50. Because the insulated structure 12 is installed subsea, the insulated structure 12 is naturally filled with interior sea water 68 which surrounds the SMA thermostat 14, the pipes 50, and the electronics assembly 52. As discussed above, the interior sea water 68 absorbs heat from a heat source (e.g., the pipes 50 and the flow control device 66 flowing the fluid 64). Consequently, the interior sea water 68 gradually increases in temperature. Similarly, the temperature of the interior sea water 68 rises due to the insulative layer 62 of the insulated structure 12 retaining the heat transferred from the fluid 64 flowing through the pipes 50. For example, absent any temperature regulation in the insulated structure 12, the interior sea water 68 may reach temperatures of approximately 30° C.-140° C., 40° C.-130° C., 50° C.-120° C., 60° C.-110° C., 70° C.-100° C., 80° C.-90° C. or more.

As mentioned above, the illustrated embodiment of the insulated structure 12 also includes the electronics assembly 52, which includes several subassemblies. In particular, the electronics assembly 52 has a controller 70, a position indicator 72, and a communication unit 74. The controller 70 is configured to regulate the operation of the flow control device 66. For example, the controller 70 may control the operation of a valve in the flow control device 66, thereby regulating the flow rate of the fluid 64 in the pipes 50. As mentioned above, in certain embodiments, the flow control device may be electrically, pneumatically, or hydraulically operated. The controller 70 is also configured to receive information from sensors 76 disposed throughout the insulated structure 12. For example, sensors 76 coupled to the pipes 50 may be configured to detect a temperature, flow rate, pressure, viscosity, stress or strain, chemical composition, or another parameter of the fluid 64. The position indicator 72 may provide information or include data regarding the location of the BOP stack assembly 10. The information provided by the controller 70 and the position indicator 72 may be sent to other systems in the BOP stack assembly 10 and/or to an operator of the BOP stack assembly 10 by the communication unit 74. As shown, the electronics assembly 52 and its various components are powered by a power supply 78. As mentioned above, as discussed above, the electronics assembly 52 and its sub-components are surrounded by the interior sea water 68 and may malfunction or overheat if the temperature of the interior sea water 68 is too high. For example, the electronics assembly 52 and its subcomponents may begin to overheat if the temperature of the interior sea water 68 is greater than approximately 30° C.-80° C., 40° C.-70° C., or 50° C.-60° C.

To regulate the temperature of the interior sea water 68, the insulated structure 12 includes the SMA thermostat 14.

In the illustrated embodiment, the SMA thermostat 14 is disposed near (e.g., within) the lid 62 of the insulated structure 12. As described in detail below, the SMA thermostat 14 operates to release at least a portion of the interior sea water 68 through an outlet passage 80, as indicated by arrow 82, once the temperature of the interior sea water 68 reaches a certain level. For example, the SMA thermostat 14 may be configured to maintain a temperature within the insulated structure 12 below an upper threshold or and/or above a lower threshold. To replace the interior sea water 68 that exits the insulated structure 12 through the SMA thermostat 14, exterior sea water 84 (i.e., sea water from outside the insulated structure 12) enters the insulated structure 12 through an inlet passage 86, as indicated by arrow 88. More specifically, as the interior sea water 68 exits the insulated structure 12 through the outlet passage 80, a vacuum is created within the insulated structure 12. This vacuum generates a flow of exterior sea water 84 into the insulated structure 12 through the inlet passage 86. The exterior sea water 84 may have a temperature of approximately 1° C.-6° C., 2° C.-5° F., or 3° C.-4° C. Therefore, as heated interior sea water 68 exits the insulated structure 12 and is replaced by exterior sea water 84, the overall temperature of the interior sea water 68 decreases. As discussed below, once the temperature of the interior sea water 68 cools to a certain level, the SMA thermostat 14 operates to block the flow of the interior sea water 68 through the outlet passage 80.

Figure 5:
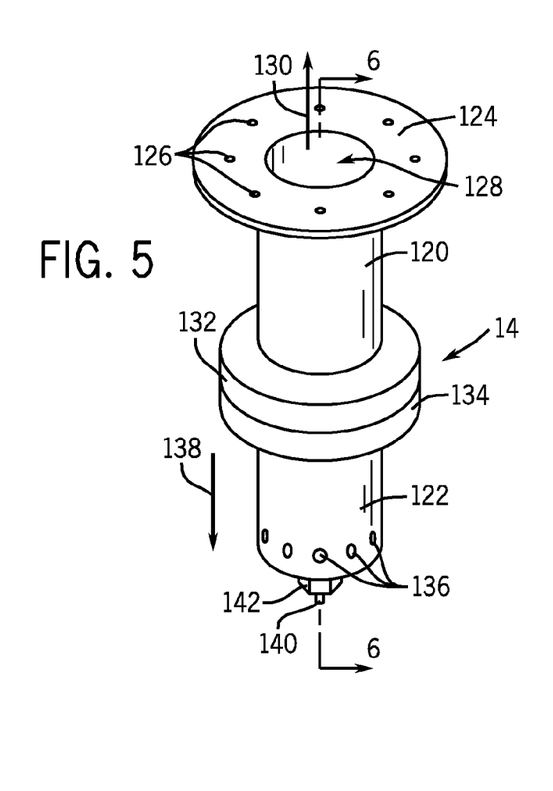
FIG. 5 is a perspective view of an embodiment of an SMA thermostat.

FIG. 5 is a perspective view of an embodiment of the SMA thermostat 14 of FIG. 4 in a closed position, illustrating a body 120 (i.e., a stationary portion) and a sleeve 122 (i.e., a movable portion) of the SMA thermostat 14. As discussed in detail below, the body 120 and the sleeve 122 of the SMA thermostat 14 are substantially hollow and are each configured to receive a flow of the interior sea water 68 within the insulated structure 12. In the illustrated embodiment, the body 120 and the sleeve 122 are generally concentric and/or coaxial. The body 120 and the sleeve 122 are made from materials that are conducive to subsea environments. For example, the body 120 and the sleeve 122 may be constructed from stainless steel, a nickel-based metal, or plastic coated steel. As discussed below, the interior of the body 120 and the interior of the sleeve 122 are separated. In the illustrated embodiment, the body 120 of the SMA thermostat 14 includes a flange 124 having apertures 126. Specifically, the flange 124 is configured to abut the outlet passage 80 of the insulated structure 12. The apertures 126 of the flange 126 receive fasteners to secure the SMA thermostat 14 to the outlet passage 80. In this manner, the SMA thermostat 14 may be suspended within the insulated structure 12 to monitor the temperature of the interior sea water 68. Furthermore, the flange 124 encircles an opening 128 of the body 120 through which the interior sea water 68 may flow from within the insulated structure 12 to the outlet passage 80, as indicated by arrow 130. As discussed below, the body 120 houses at least one biasing spring of the SMA thermostat 14. In the illustrated embodiment, the body 120 has a generally cylindrical shape. In other embodiments, the body 120 may have a square or other polygonal shape. The body 120 further includes a first rim flange 132, which abuts a second rim flange 134 of the sleeve 122. As shown, the first and second rims 132 and 134 are adjacent to one another when the SMA thermostat 14 is in the closed position. As discussed below, a sealing ring may be disposed between the first and second rims 132 and 134.

The sleeve 122 is a generally hollow body that is at least partially disposed about the body 120 of the SMA thermostat 14. As mentioned above, the sleeve 122 and the body 120 are generally concentric. The sleeve 122 houses at least one SMA spring of the SMA thermostat 14. Furthermore, the sleeve 122 includes fluid channels 136 through which the interior sea water 68 may flow into the interior of the sleeve 122. As discussed below, the interior sea water 68 contacts the SMA spring within the sleeve 122. When the interior sea water 68 reaches a phase transition temperature of the SMA spring, the SMA spring undergoes a phase transition, thereby actuating telescopic movement, in a direction 138, of the sleeve 122 relative to the body 120 of the SMA thermostat 14. In the illustrated embodiment, the SMA thermostat 14 includes a rod 140, which passes through the interior of the sleeve 122 and the interior of the body 120 in an axial direction. As discussed below, a biasing spring within the body 120 and the SMA spring within the sleeve 122 are disposed about the rod 140, wherein the springs may oppose one another. In certain embodiments, the rod 140 may be a bolt constructed from stainless steel or a nickel-based metal. The rod 140 is partially secured to the sleeve 122 by a nut 142.

Figure 6:
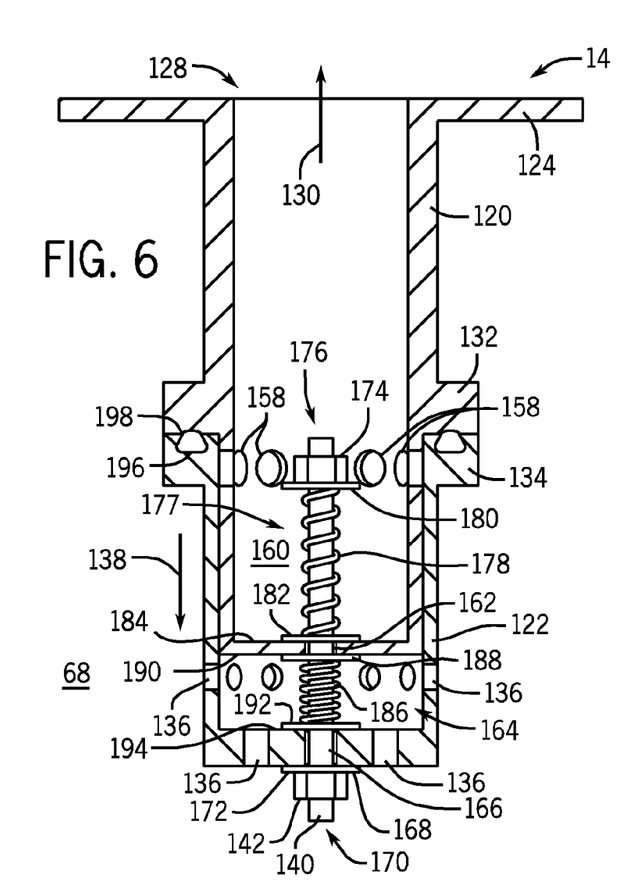
FIG. 6 is a cross-sectional side view of an embodiment of the SMA thermostat of FIG. 5, taken along line 6-6 of FIG. 5, illustrating the SMA thermostat in a closed position.

FIG. 6 is a cross-sectional side view of an embodiment of the SMA thermostat 14 of FIG. 5, taken along line 6-6 of FIG. 5, illustrating the SMA thermostat 14 in a closed position. As mentioned above, the SMA thermostat 14 includes the body 120 and the sleeve 122, which is partially disposed about the body 120 in a concentric arrangement. In the closed position, flow ports 158 in the body 120 of the SMA thermostat 14 are covered and blocked by the sleeve 122. Consequently, the interior sea water 68 in the insulated structure 12 is prevented from flowing through the flow ports 158 and exiting the insulated structure 12. In the illustrated embodiment, the rod 140 couples the body 120 to the sleeve 122. Specifically, the rod 140 passes through an interior 160 of the body 120, an aperture 162 of the body 120, an interior 164 of the sleeve 122 and an aperture 166 of the sleeve 122. The nut 142 secures an end 170 of the rod 140 to an outer surface 168 of the sleeve 122. Additionally, a washer 172 is disposed between the nut 142 and the outer surface 168 of the sleeve 122. Similarly, a nut 174 is secured to an end 176 of the rod 140 within the interior 160 of the body 120.

The SMA thermostat 14 also has a spring assembly 177, which includes the rod 140. As mentioned above, a biasing spring 178 is disposed about the rod 140 within the interior 160 of the body 120 of the SMA thermostat 14. More specifically, the biasing spring 178 is disposed about the rod 140 between a washer 180, which abuts the nut 174 (i.e., a spring retainer), and a washer 182, which abuts an inner surface 184 of the body 120. The biasing spring 178 is constructed from a material conducive to a subsea environment. For example, the biasing spring 178 may be constructed from a nickel-based metal or plastic coated steel. Additionally, an SMA spring 186 is disposed about the rod 140 within the interior 164 of the sleeve 122. More specifically, the SMA spring 186 is disposed about the rod 140 between a washer 188, which abuts an outer surface 190 of the body 120, and a washer 192, which abuts an inner surface 194 of the sleeve 122. As mentioned above, the SMA spring 186 is constructed from a shape memory material such as Nitinol.

In the illustrated embodiment, the SMA thermostat 14 is in a closed position, and the SMA spring 186 is in the Martensite phase. As discussed above, in the Martensite phase, the SMA material may be easily deformed by an external force. In the illustrated embodiment, the biasing force of the biasing spring 178 causes the SMA spring 186 to compress. As will be appreciated, when selecting a biasing spring 178 for use in the SMA thermostat 14, it may be important to select a biasing spring 178 that exerts a biasing force greater than the biasing force exerted by the SMA spring 186 in the Martensite phase, thereby causing the SMA spring 186 to compress. As shown, when the SMA spring 186 is compressed, the SMA thermostat 14 is closed as the sleeve 122 and the body 120 abut one another at the rims 132 and 134, respectively. The rim 134 of the sleeve 122 has an annular recess 196 supporting an annular seal 198. In certain embodiments, the annular seal 198 may be an elastomer-based seal. When the SMA thermostat 14 is in the closed position, and the rims 132 and 134 abut one another, the annular seal 198 serves to block the interior sea water 68 from entering the interior 160 of the body 120 through the flow ports 158.

Figure 7:
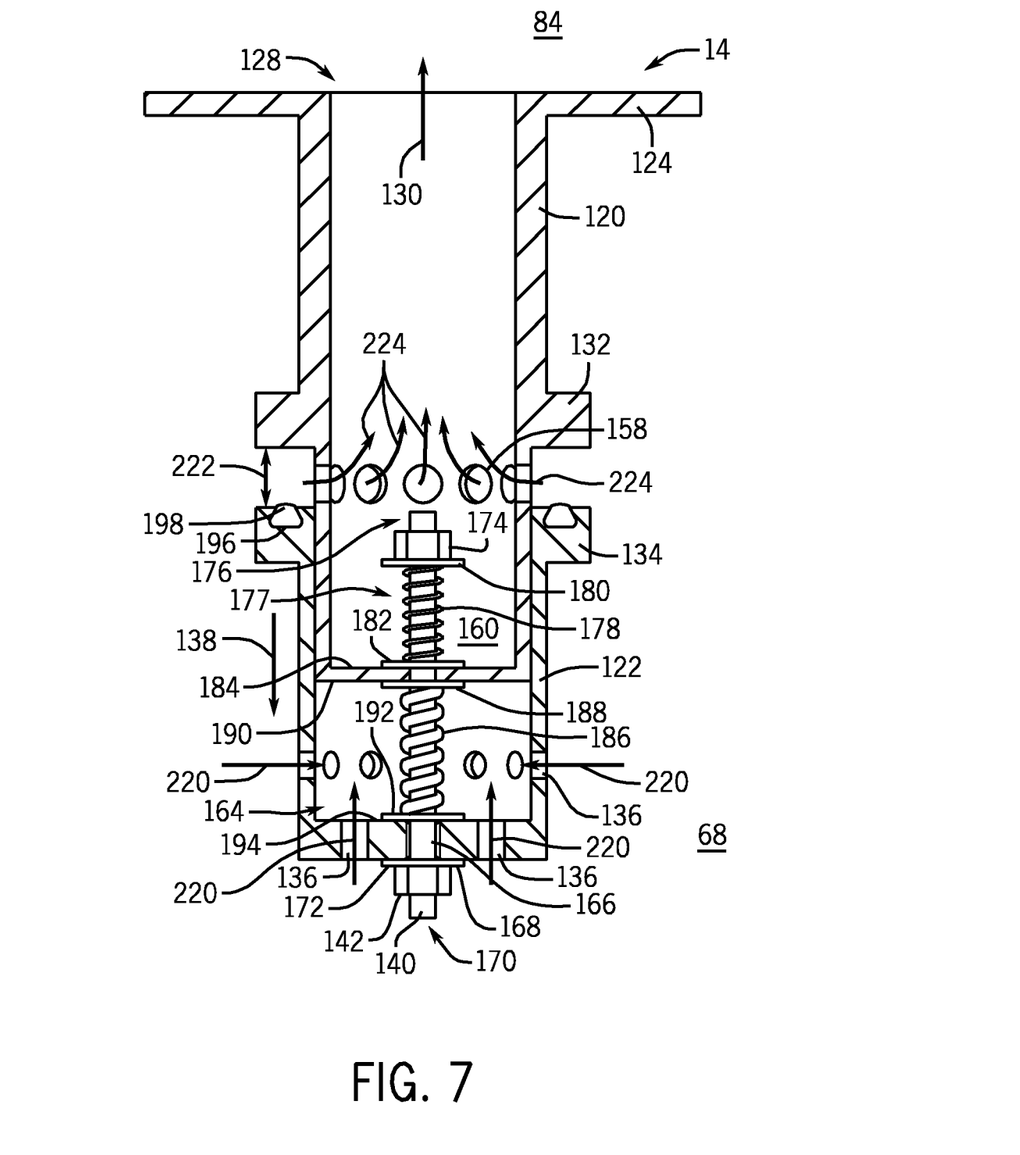
FIG. 7 is a cross-sectional side view of an embodiment of the SMA thermostat of FIG. 5, taken along line 6-6 of FIG. 5, illustrating the SMA thermostat in an open position.

FIG. 7 is a cross-sectional side view of an embodiment of the SMA thermostat 14 of FIG. 6, taken along line 6-6 of FIG. 5, illustrating the SMA thermostat 14 in an open position. More specifically, the illustrated embodiment shows the SMA spring 186 in the Austenite phase, thereby causing the SMA spring 186 to expand and compress the biasing spring 178. In expanding, the SMA spring 186 shifts the sleeve 122 in the direction 138, thereby exposing the flow ports 158 to the interior sea water 68. The illustrated embodiment includes similar elements and element numbers as the embodiment shown in FIG. 6.

The interior sea water 68 flows into the interior 164 of the sleeve 122 through the apertures 136, as indicated by arrows 220. As discussed above, the interior sea water 68 absorbs heat from the fluid 64 flowing through the pipes 50 that pass through the insulated structure 12. The temperature of the interior sea water 68 may eventually rise to a phase transition temperature of the SMA spring 186. For example, the phase transition temperature of the SMA spring 186 may be approximately 40° C.-70° C., 45° C.-65° C., or 50° C.-60° C. Moreover, the SMA spring 186 may be designed to have a specific phase transition temperature. Specifically, the composition of the SMA material may be adjusted to achieve a desired phase transition temperature. For example, for SMA springs 186 constructed from Nitinol, the nickel composition of Nitinol may be increased or decreased in increments of approximately 0.01%-0.3%, 0.02%-0.25%, 0.03%-0.20%, 0.04%-0.15%, or 0.05%-0.1% to adjust the phase transition temperature of Nitinol. As the SMA spring 186 undergoes the phase transition from the Martensite phase to the Austenite phase, the material properties and the microstructure of the SMA spring 186 are altered. The changes in material properties and microstructure cause the SMA spring 186 to expand and exert a force on the biasing spring 178. As will be appreciated, the biasing force exerted on the biasing spring 178 by the SMA spring 186 in the Austenite phase is greater than the biasing force exerted by the biasing spring 178 on the SMA spring 186. Consequently, the biasing spring 178 compresses and the sleeve 122 shifts in the direction 138. In the illustrated embodiment, the biasing force exerted by the SMA spring 186 causes the sleeve 122 to shift a distance 222, thereby exposing the flow ports 158 to the interior sea water 68. With the flow ports 158 opened, the interior sea water 68 flows into the interior 160 of the body 120 of the SMA thermostat 14, as represented by arrows 224. Thereafter, the interior sea water 68 rises towards the opening 128 of the body 120, as indicated by arrow 130, due to buoyancy differences and natural convection. More specifically, because the interior sea water 68 is heated to a temperature greater than the exterior sea water 84, the interior sea water 68 is more buoyant than the exterior sea water 84 surrounding the insulated structure 12. Consequently, the interior sea water 68 naturally rises towards the opening 128 of the body 120 and the outlet passage 80 of the insulated structure 12. In other words, the flow occurs without a pump or other component requiring energy to operate. The SMA thermostat 14 will operate without electricity, hydraulic fluid, or the like. As a result, the SMA thermostat 14 may have a long operational life, providing high reliability and requiring low maintenance.

As discussed above, the interior sea water 68 that flows through the body 120 of the SMA thermostat 14 is replaced by exterior sea water 84 that flows into the insulated structure 12 through the inlet passage 86 of the insulated structure 12. As exterior sea water 84 flows into the insulated structure 12 to replace the interior sea water 68 that has exited the insulated structure 12 through the SMA thermostat 14, the overall temperature of the interior sea water 68 gradually decreases. Eventually, the temperature of the interior sea water 68 will drop below the phase transition temperature of the SMA spring 186, at which point the SMA spring 186 will undergo a phase transition from the Austenite phase back to the Martensite phase. The phase transition from the Austenite phase to the Martensite phase decreases the biasing force of the SMA spring 186. Once the SMA spring 186 returns to the Martensite phase, the biasing force of the biasing spring 178 on the SMA spring 186 will overcome the biasing force of the SMA spring 186 on the biasing spring 178. As a result, the SMA spring 186 will compress, causing the sleeve 122 and the SMA thermostat 14 to shift back to the closed position shown in FIG. 6 and block any further flow of sea water.

Figure 8:
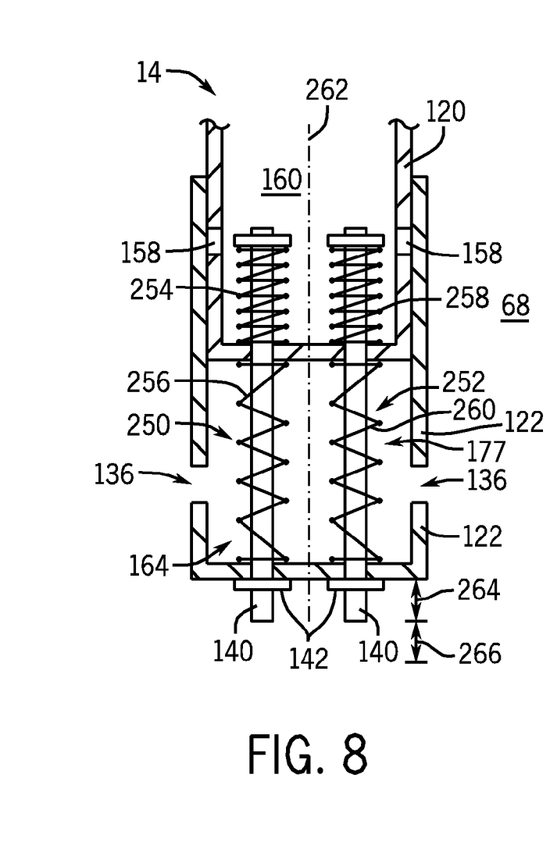
FIG. 8 is a schematic of an embodiment of the SMA thermostat of FIG. 5, where the SMA thermostat includes two SMA spring assemblies in a parallel configuration.
Figure 9:
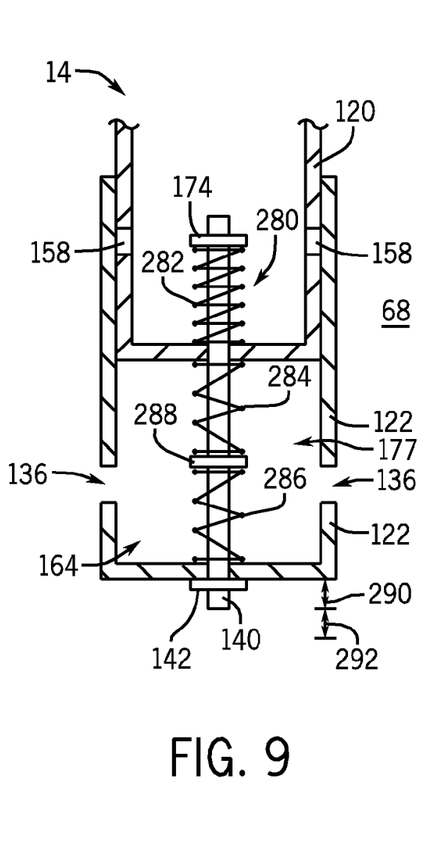
FIG. 9 is a schematic of an embodiment of the SMA thermostat of FIG. 5, where the SMA thermostat has an SMA spring assembly with two SMA springs in a series configuration.
Figure 10:
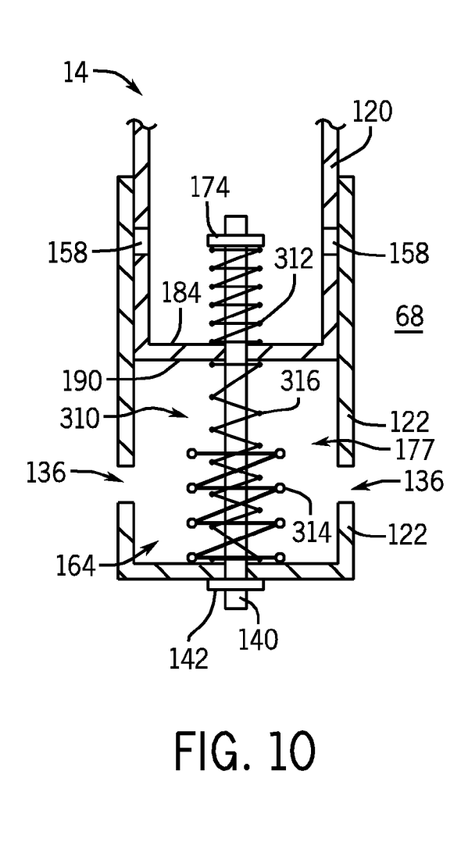
FIG. 10 is a schematic of an embodiment of the SMA thermostat of FIG. 5, where the SMA thermostat has an SMA spring assembly with two SMA springs in a nested configuration.

FIGS. 8-10 are cross-sectional schematics of embodiments of the SMA thermostat 14 of FIG. 6, illustrating various configurations of spring assemblies 177 within the SMA thermostat 14. The illustrated embodiments of FIGS. 8-10 include similar elements and element numbers as the embodiment shown in FIG. 6. FIG. 8 illustrates an embodiment of the SMA thermostat 14 having a first spring assembly 250 and a second spring assembly 252 in a parallel configuration, wherein each assembly 250 and 252 has a plurality of springs in a series configuration. Specifically, the first spring assembly 250 has a first biasing spring 254 and a first SMA spring 256 in a first series, and the second spring assembly 252 has a second biasing spring 258 and a second SMA spring 260 in a second series. As shown, first and second spring assemblies 250 and 252 are disposed about a central axis 262 of the SMA thermostat 14. Other embodiments may have additional spring assemblies 177 in series and/or parallel with one another about the central axis 262. For example, certain embodiments may include 2-10, 3-9, 4-7, or 5-6 spring assemblies 177 disposed about the central axis 262. As will be appreciated, the SMA thermostat 14 shown in FIG. 8 operates in a similar manner to the SMA thermostat 14 shown in FIGS. 6 and 7. For example, the first and second SMA springs 256 and 260 may have similar phase transition temperatures. As a result, the first and second SMA springs 256 and 260 may undergo the phase transition from Martensite to Austenite at the same time, thereby cooperatively shifting the sleeve 122 to the open position shown in FIG. 7. In other embodiments, the first and second SMA springs 256 and 260 may have different phase transition temperatures. For example, the first SMA spring 256 may have a phase transition temperature of approximately 40 to 50° C., 42 to 48° C., or 44 to 46° C., and the second SMA spring 260 may have a phase transition temperature of approximately 50 to 60° C., 52 to 58° C., or 54 to 56° C. Furthermore, in some embodiments, the phase transition temperatures of the first SMA spring 256 and the second SMA spring 260 may have a selected temperature difference. For example, the phase transition temperatures of the first SMA spring 256 and the second SMA spring 260 may have a temperature difference of approximately 1 to 20, 1 to 15, 1 to 10, or 1 to 5° C. As will be appreciated, in embodiments where the first and second SMA springs 256 and 260 have different phase transition temperatures, the first and second SMA springs 256 and 260 will undergo the phase transition from Martensite to Austenite at different times. For example, the first SMA spring 256 may undergo the phase transition from Martensite to Austenite at a first temperature, thereby partially compressing the first and second biasing springs 254 and 258 and causing the sleeve 122 to shift a distance 264. In certain embodiments, the sleeve 122 shifting the distance 264 may partially expose the flow ports 158 to the interior sea water 68, allowing interior sea water 68 to flow at a first flow rate into the interior 160 of the body 120 of the SMA thermostat 14 and exit the insulated structure 12 through the outlet passage 80. Further, the temperature of the interior sea water 68 may continue to rise to the phase transition temperature of the second SMA spring 260 (e.g., a second temperature), causing the second SMA spring 260 to undergo the phase transition from Martensite to Austenite. In certain embodiments, the second temperature may be approximately to 1 to 50, 1 to 40, 1 to 30, 1 to 20, or 1 to 10° C. greater than the first temperature. The phase transition of the second SMA spring 260 causes the first and second biasing springs 254 and 258 to further compress, thereby shifting the sleeve 122 an additional distance 266. By shifting the additional distance 266, the sleeve 122 may fully expose the flow ports 158 to the interior sea water 68, allowing further flow of the interior sea water 68 into the body 120 of the SMA thermostat 14. Thus, the flow rate may increase from the first flow rate to a second flow rate, which may be substantially greater than the first flow rate. For example, the second flow rate may be approximately 10 to 500%, 10 to 250%, 10 to 100%, or 10 to 50% greater than the first flow rate.

FIG. 9 illustrates the SMA thermostat 14 having a spring assembly 280 with SMA springs in a series configuration. Specifically, the spring assembly 280 has a rod 140 supporting a biasing spring 282, a first SMA spring 284, and a second SMA spring 286 in series with one another and coaxial with the rod 140. In the illustrated embodiment, the first and second SMA springs 284 and 286 are disposed about the rod 140 within the interior 164 of the sleeve 122 and are separated by a washer 288. As will be appreciated, the SMA thermostat 14 shown in FIG. 9 operates in a similar manner to the SMA thermostat 14 shown in FIGS. 6 and 7. For example, the first and second SMA springs 284 and 286 may have similar phase transition temperatures. As a result, the first and second SMA springs 284 and 286 may undergo the phase transition from the Martensite phase to the Austenite phase at the same time, thereby cooperatively shifting the sleeve 122 to the open position shown in FIG. 7. In other embodiments, the first and second SMA springs 284 and 286 may have different phase transition temperatures. For example, the first SMA spring 284 may have a phase transition temperature of approximately 40 to 50° C., 42 to 48° C., or 44 to 46° C., and the second SMA spring 286 may have a phase transition temperature of approximately 50 to 60° C., 52 to 58° C., or 54 to 56° C. As will be appreciated, in embodiments where the first and second SMA springs 284 and 286 have different phase transition temperatures, the first and second SMA springs 284 and 286 will undergo the phase transition from the Martensite phase to the Austenite phase at different times. For example, the first SMA spring 284 may undergo the phase transition from Martensite to Austenite at a first temperature, thereby partially compressing the biasing spring 282 and causing the sleeve 122 to shift a distance 290. In certain embodiments, the sleeve 122 shifting the distance 290 may partially expose the flow ports 158 to the interior sea water 68, allowing interior sea water 68 to flow at a first flow rate into the body 120 of the SMA thermostat 14 and exit the insulated structure 12 through the outlet passage 80. Further, the temperature of the interior sea water 68 may continue to rise to the phase transition temperature of the second SMA spring 286 (e.g., a second temperature), causing the second SMA spring 286 to undergo the phase transition from Martensite to Austenite. In certain embodiments, the second temperature may be approximately to 1 to 50, 1 to 40, 1 to 30, 1 to 20, or 1 to 10° C. greater than the first temperature. The phase transition of the second SMA spring 286 causes the biasing springs 282 to further compress, thereby shifting the sleeve 122 an additional distance 292. By shifting the additional distance 292, the sleeve 122 may fully expose the flow ports 158 to the interior sea water 68, allowing further flow of the interior sea water 68 into the body 120 of the SMA thermostat 14. Thus, the flow rate may increase from the first flow rate to a second flow rate, which may be substantially greater than the first flow rate. For example, the second flow rate may be approximately 10 to 500%, 10 to 250%, 10 to 100%, or 10 to 50% greater than the first flow rate.

FIG. 10 illustrates the SMA thermostat 14 having a spring assembly 310 with a nested configuration. Specifically, the spring assembly 310 has the rod 140 supporting a first biasing spring 312, a second biasing spring 314, and an SMA spring 316. In the illustrated embodiment, the second biasing spring 314 and the SMA spring 316 are disposed about the rod 140 within the interior 164 of the sleeve 122. More particularly, the SMA spring 316 is disposed about the rod 140, and the second biasing spring 314 is disposed about the rod 140 and the SMA spring 316 (i.e., the rod 140, the SMA spring 316 and the second biasing spring 314 are generally concentric). When the SMA thermostat 14 is in the fully closed position, the first biasing spring 312 abuts the inner surface 184 of the body 120, and the second biasing spring 314 abuts the outer surface 190 of the body 120. Additionally, the SMA spring 316 also abuts the outer surface 190 of the body 120. In certain embodiments, the first and second biasing springs 312 and 314 may be similar, applying similar forces on the body 120. In other words, the first and second biasing springs 312 and 314 may be selected such that the sleeve 122 and SMA thermostat 14 are in a state of equilibrium and in the closed position when the SMA spring 316 is in the Martensite phase. For example, the first and second biasing springs 312 and 314 may apply substantially equal forces to the body 120 (i.e., to the inner surface 184 and the outer surface 190) when the SMA thermostat 14 is in the closed position, and thus the force required to shift the sleeve 122 may be small. More specifically, in certain embodiments, the spring force of the first biasing spring 312 may be substantially equal to the sum of the spring forces by the second biasing spring 314 and the SMA spring 316 below the transition temperature of the SMA spring 316. In other embodiments, the spring force of the first biasing spring 312 may be slightly stronger than the combined spring forces of the second biasing spring 314 and the SMA spring 314. For example, the spring force of the first biasing spring 312 may be approximately 100 to 120%, 100 to 115%, 100 to 110%, or 100 to 105% of the sum of the spring forces by the second biasing spring 314 and the SMA spring 316 below the transition temperature of the SMA spring 316.

When the interior sea water 68 reaches the phase transition temperature of the SMA spring 316 and the SMA spring 316 transitions from the Martensite phase to the Austenite phase, the force applied by the expanding SMA spring 316 may quickly cause the sleeve 122 to begin shifting. That is, when the SMA spring 316 transitions to the Austenite phase, expands, and begins exerting a force on the outer surface 190 of the body 120, the SMA spring 316 may not have to overcome the entire force applied on the inner surface 184 of the body 120 by the first biasing spring 312. This is because the second biasing spring 314 may exert an equal and opposite force on the outer surface 190 of the body 120, thereby offsetting the force applied by the biasing spring 312. In other words, after the SMA spring 316 reaches the transition temperature, the SMA spring 316, assisted by the spring force of the second biasing spring 314, easily overcomes the spring force of the first biasing spring 312.

By including an SMA thermostat 14, the temperature of the interior sea water 68 may be monitored and regulated within the insulated structure 12. Moreover, the SMA thermostat 14 allows for the monitoring and regulation of the temperature within the insulated structure 12 without the use of sensors or electronic monitoring equipment. The regulation of the temperature of the interior sea water 68 helps prevent the electronics assembly 52 from being exposed to elevated temperatures which may cause the electronics assembly 52 and its subcomponents to malfunction or overheat. Additionally, the operation of the SMA thermostat 14 requires no electricity, hydraulics, pneumatics, or the like. Similarly, the SMA thermostat 14 does not require any external equipment such as pumps, actuators, and so forth. That is, the SMA thermostat 14 is self-powered and self-sustaining. Consequently, the SMA thermostat 14 may have a long operational life, providing high reliability and requiring low maintenance.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
an underwater component;
a shape memory alloy thermostat disposed within the underwater component, wherein the shape memory alloy thermostat comprises a plurality of openings configured to expose a shape memory alloy material of the shape memory alloy thermostat to seawater within an interior defined by the underwater component, wherein the shape memory alloy material is configured to undergo a phase change between a first phase and a second phase in response to a temperature change of the seawater, the shape memory alloy material is configured to open or close a fluid path fluidly coupling the interior defined by the underwater component and an environment surrounding an exterior surface of the underwater component in response to the phase change, and wherein the shape memory alloy thermostat comprises a stationary body portion and a movable sleeve portion disposed about an outer surface of the stationary body portion; and
an electronics component disposed within the interior of the underwater component, wherein the electronics component is surrounded by the seawater within the interior.

2. The system of claim 1, wherein the shape memory alloy material is configured to open the fluid path in response to the phase change.

3. The system of claim 1, wherein the shape memory alloy material is configured to close the fluid path in response to the phase change.

4. The system of claim 1, wherein the fluid path comprises a water path.

5. The system of claim 1, wherein the underwater component comprises a thermally insulated enclosure having the interior, an internal component disposed within the interior of the thermally insulated enclosure, and a heat source disposed within the interior.

6. The system of claim 5, wherein the heat source comprises a fluid conduit, a flow control device, or a combination thereof.

7. The system of claim 1, wherein the shape memory alloy thermostat comprises a first biasing element made of the shape memory alloy material, wherein the first biasing element is configured to provide a first biasing force in the first phase, the first biasing element is configured to provide a second biasing force in the second phase, and the first and second biasing forces are different from one another.

8. The system of claim 7, wherein the shape memory alloy thermostat comprises a second biasing element opposing the first biasing element, and the second biasing element is configured to provide a third biasing force greater than the first biasing force and less than the second biasing force.

9. The system of claim 8, wherein the first and second biasing elements are disposed between the stationary body portion and movable sleeve portion to control movement of the movable sleeve portion relative to the stationary body portion to open or close the fluid path.

10. The system of claim 9, wherein the stationary body portion comprises a stationary tube, the stationary tube and the movable sleeve portion are concentric with one another, the first biasing element is configured to move the movable sleeve portion in a first direction in the second phase of the shape memory alloy material, and the second biasing element is configured to move the movable sleeve portion in a second direction in the first phase of the shape memory alloy material.

11. The system of claim 10, wherein the shape memory alloy thermostat comprises a shaft coupled to a first end portion of the movable sleeve portion and extending through a second end portion of the stationary tube, the first biasing element is disposed in a first volume about the shaft inside the movable sleeve portion between, the first and second end portions, and the second biasing element is disposed in a second volume about the shaft inside the stationary tube between the second end portion and a spring retainer coupled to the shaft.

12. The system of claim 11, wherein the stationary tube comprises the fluid path, and the movable sleeve portion comprises a fluid port into the first volume.

13. The system of claim 1, wherein the underwater component comprises a subsea component, a mineral extraction component, a flow control device, a controller, a sensor, or a combination thereof.

14. The system of claim 1, wherein the exterior surface of the underwater component is an entire exterior surface of the underwater component.

15. The system of claim 1, comprising a fluid conduit extending from an underwater component inlet through the underwater component to an underwater component outlet, wherein the shape memory alloy thermostat is separate from the fluid conduit, and the electronics component is separate from the fluid conduit and external to the fluid conduit.

16. A system, comprising:
an underwater container;
a fluid conduit extending from an underwater container inlet, through the underwater container, to an underwater container outlet;
an underwater component disposed within the underwater container separate from the fluid conduit and external to the fluid conduit; and
a shape memory alloy thermostat separate from the fluid conduit, wherein the shape memory alloy thermostat comprises a shape memory alloy material configured to undergo a phase change between a first phase and a second phase in response to a temperature change, the shape memory alloy material is configured to open or close a fluid path fluidly coupling an interior volume formed by the underwater container and an exterior surface of the underwater container in response to the phase change, wherein an interior surface of the underwater container is exposed to the interior volume, and wherein the shape memory alloy thermostat comprises a stationary body portion and a movable sleeve portion disposed about an outer surface of the stationary body portion.

17. The system of claim 16, wherein the first phase comprises a Martensite phase and the second phase comprises an Austenite phase, and the phase change is configured to occur at a transition temperature.

18. The system of claim 17, wherein the transition temperature is less than a threshold temperature to protect a material strength of equipment or to protect electronics from overheating.

19. The system of claim 16, wherein the shape memory alloy thermostat is a subsea equipment thermostat, a mineral extraction equipment thermostat, a flow control device thermostat, or a combination thereof.

20. A system, comprising:
a shape memory alloy thermostat, comprising:
a first biasing element comprising a shape memory alloy material, wherein the first biasing element is configured to provide a variable first biasing force based on a phase of the shape memory alloy material;
a second biasing element configured to provide a second biasing force that opposes the variable first biasing force;
a stationary portion comprising a body, wherein the body comprises a plurality of apertures extending from an exterior surface of the body to an interior of the body;
a movable valve portion comprising a sleeve, wherein the movable valve portion is configured to open or close depending on whether the variable first biasing force is less than or greater than the second biasing force, and the sleeve is configured to occlude the plurality of apertures of the body to disable fluid flow into the body when the shape memory alloy thermostat is in a closed position; and
a rod extending through a surface of the sleeve and into the body,
wherein the sleeve is disposed at least partially about the body, the rod is fixedly attached to the sleeve, the first and second biasing elements are disposed about the rod, the first biasing element is disposed entirely within the movable valve portion, and the second biasing element is disposed entirely within the body.

21. The system of claim 20, wherein the shape memory alloy thermostat is a subsea equipment thermostat, a mineral extraction equipment thermostat, a flow control device thermostat, or a combination thereof.

* * * * *